US012807032B2

(12) United States Patent
Hasse et al.

(10) Patent No.: US 12,807,032 B2
(45) Date of Patent: Nov. 24, 2026

(54) DEVICES, SYSTEMS, AND METHODS FOR OPTIMIZATION OF ELECTRICITY FORECASTS USING RICKER WAVELETS

(71) Applicant: Fermata Energy II, LLC, San Diego, CA (US)

(72) Inventors: Erik Hasse, West Fargo, ND (US); Jack Pfeiffer, San Francisco, CA (US); Sankalp Gilda, Gainesville, FL (US)

(73) Assignee: Fermata Energy II, LLC, San Diego, CA (US)

( * ) Notice: Subject to any disclaimer, the term of this patent is extended or adjusted under 35 U.S.C. 154(b) by 451 days.

(21) Appl. No.: 18/244,094

(22) Filed: Sep. 8, 2023

(65) Prior Publication Data

US 2025/0083560 A1 Mar. 13, 2025

(51) Int. Cl.
*B60L 58/12* (2019.01)
*B60L 53/66* (2019.01)
*G05B 13/02* (2006.01)

(52) U.S. Cl.
CPC ............. *B60L 58/12* (2019.02); *B60L 53/665* (2019.02); *G05B 13/0265* (2013.01)

(58) Field of Classification Search
CPC .. G05B 13/0265; B60L 55/00; B60L 2260/46
See application file for complete search history.

(56) References Cited

U.S. PATENT DOCUMENTS

2018/0097126 A1* 4/2018 Gonatas ................ H10F 77/955
2019/0217739 A1* 7/2019 Sinha ..................... B60L 53/665
2021/0221247 A1* 7/2021 Daniel .................... H02J 3/144
2024/0034180 A1* 2/2024 Bhimani ................. B60L 58/13

FOREIGN PATENT DOCUMENTS

GB 2597342 A * 1/2022 ........... G06N 3/0442

OTHER PUBLICATIONS

European Patent Office, International Search Report and Written Opinion issued in International Patent Application No. PCT/US2024/045361, mailed Dec. 17, 2024.

* cited by examiner

*Primary Examiner* — Ziaul Karim
*Assistant Examiner* — Dhruvkumar Patel
(74) *Attorney, Agent, or Firm* — SNELL & WILMER L.L.P.

(57) ABSTRACT

The present invention is directed to electronic devices, systems, and methods for improving electricity forecasts through the use of Ricker wavelets. The devices, systems, and methods may train a dataset by applying one or more features to historical energy consumption data, historical energy production data, and weather data for a site. One of the features may be continuous wavelets, such as Ricker wavelets. The devices, systems, and methods may also forecast, using a machine-learning model, the future energy consumption and the future energy production at the site based on the trained dataset. The devices, systems, and methods may determine, using an optimization algorithm, a dispatch schedule for an electric vehicle battery based on the future energy consumption and the future energy production at the site. The devices, systems, and methods may then control one or more charges or discharges of the electric vehicle battery based on the dispatch schedule.

14 Claims, 9 Drawing Sheets

1400

DEVICES, SYSTEMS, AND METHODS FOR OPTIMIZATION OF ELECTRICITY FORECASTS USING RICKER WAVELETS

BACKGROUND

The present disclosure generally relates to devices, systems, and methods of improving electricity forecasts using Ricker wavelets for use with charging and discharging operations of a bi-directional electrical vehicle battery for monetization or other vehicle-to-grid activities.

As concerns for the environment and depletion of resources increase, the use of plug-in electric vehicles has become more popular. Such vehicles include battery electric vehicles (BEVs), plug-in hybrid electric vehicles (PHEVs), and hydrogen fuel cell electric vehicles (FCEVs). These vehicles typically include one or more electric motors that are powered by one or more batteries. There are different types of electric vehicle batteries, such as lead-acid, nickel metal hydride, sodium, and lithium-ion. Each such battery may be provided in different storage capacities, which are generally measured in kilowatt-hours ("kWh").

As the use of electric vehicles has become more prevalent and the availability of such vehicles has increased, attempts have been made to utilize them in revenue generating and/or cost saving activities, such as vehicle-to-grid activities. Conventional vehicle-to-grid activities include demand response services, such as discharging electricity from the electric vehicle batteries to the power grid or throttling the batteries' charging rate as charging costs change. Conventional vehicle-to-grid systems generally do not consider factors related to battery health or optimization of the battery while performing such activities or in creating schedules of charge and discharge commands or otherwise dispatching electric vehicles for use. For example, methods of using temperature data to ensure battery health whenever electricity is discharged from the electric vehicle batteries, particularly during revenue generating and/or cost saving activities, are described in U.S. Pat. No. 11,135,936, incorporated by reference herein in its entirety.

Conventional chargers or standard quick chargers for electric vehicles only allow flow in one direction (i.e., power only flows from the charger to the electric vehicle) and are not suitable for vehicle-to-grid activities. Also, the standard quick charger is a slave to the process of charging the electric vehicle. For example, the standard quick charger automatically begins charging operations when plugged into a vehicle, automatically disengages when the vehicle communicates that it is fully charged and does not perform any assessment of the state of the vehicle to determine what operation to perform. A bi-directional power conversion device, in particular a bi-directional charger for use with an electric vehicle, such as the charger disclosed in U.S. patent application Ser. No. 17/102,284, which is incorporated by reference herein in its entirety, provides bi-directional flow of power to charge the electric vehicle and to discharge the electric vehicle into the grid or building and enables the vehicle to engage in such revenue generating and/or cost saving activities. Further, such a bi-directional charger enables assessment of the state of the vehicle to determine what operation to perform and communicates with software to conduct vehicle-to-grid activities. Such a bi-directional charger may be used to optimize revenue generating and/or cost saving activities by providing bi-directional power flow between an electric vehicle and an AC source, such as a utility grid.

However, a need exists to further optimize the bi-directional charging and discharging of electric vehicles in order to perform vehicle-to-grid activities in a way that maximizes both battery health/performance and the results of the activity.

BRIEF DESCRIPTION OF THE DRAWINGS

In the aforementioned figures, like reference numerals refer to like parts, components, structures, and/or processes.

DETAILED DESCRIPTION OF THE DISCLOSED EMBODIMENTS

Figure 1A:
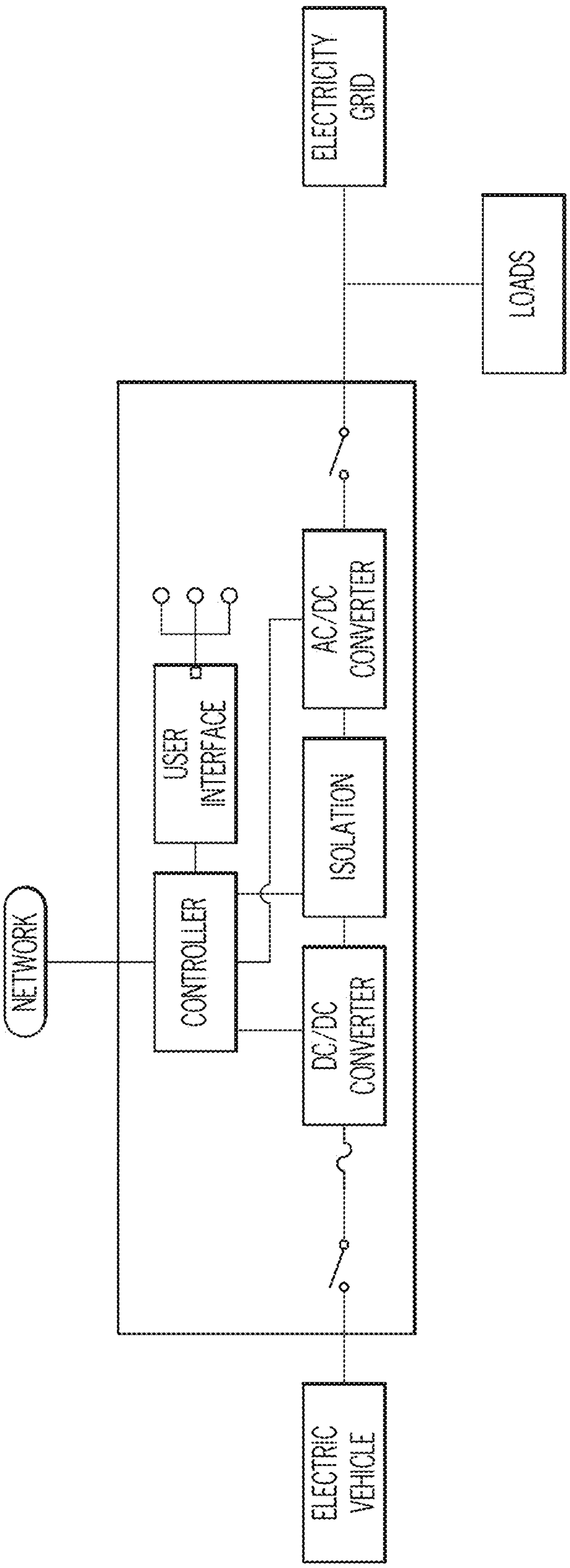
FIGS. 1A-C are diagrams of the basic topology of a bi-directional charger and system for vehicle-to-grid operations.

As will be understood by those of ordinary skill in the art, aspects of the present disclosure may be illustrated and described herein in any of a number of patentable classes or contexts, including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or by combining software and hardware implementations that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, radio frequency (RF), etc. or any suitable combination thereof.

Computer program code for carrying out operations for aspects of the present disclosure may be written in any combination of one or more programming languages, such as any of the programming languages listed at https://githut.info/ (e.g., JAVASCRIPT, JAVA, PYTHON, CSS, PUP, RUBY, C++, C, SHELL, C#, OBJECTIVE C, etc.) or other programming languages. The program code may be executed by a processor or programmed into a programmable logic device. The program code may be executed as a stand-alone software package. The program code may be executed entirely on an embedded computing device or partly on an embedded computing device (e.g., partly on a server and partly on a personal computer and partly on an embedded device). The program code may be executed on a client, on a server, partly on a client and partly on a server, or entirely on a server or other remote computing device. The program code also may be executed on a plurality of a combination of any of the foregoing, including a cluster of personal computers or servers. The server or remote computing device may be connected to the client (e.g., a user's computer) through any type of network, including a local area network (LAN), a wide area network (WAN), or a cellular network. The connection also may be made to an external computer or server (e.g., through the Internet using an Internet Service Provider) in a cloud computing environment or offered as a service such as a Software as a Service (SaaS).

The electric vehicle in which the present disclosure may be implemented may be any vehicle with a battery that may be utilized as an energy storage asset, including an electric truck, electric bus, electric car, electric forklift, electric motorcycle, electric scooter, electric wheelchair, electric bicycle, etc. While such batteries are typically found in these types of exemplary vehicles, they also may be found in other mobile energy storage assets. It may be important to maintain battery health during bidirectional charging activities, including revenue generating and/or cost saving activities, so that the batteries remain in optimal condition to power the electric vehicles when not being used for such bidirectional charging activities, including revenue generating and/or cost saving activities.

The bi-directional charger, such as the bi-directional charger disclosed in U.S. patent application Ser. No. 17/102,284, which is incorporated by reference herein in its entirety, may be used with any vehicle with a battery that may be utilized as an energy storage asset, including an electric truck, electric bus, electric car, electric forklift, electric motorcycle, electric scooter, electric wheelchair, electric bicycle, etc. (provided it is configured for bi-directional charging). While such batteries are typically found in these types of exemplary vehicles, they also may be found in other mobile energy storage assets. Such a bi-directional charger may interface with the electric vehicle and application software to optimize battery health during revenue generating and/or cost saving activities so that the batteries remain in optimal condition to power the electric vehicles when not being used for such during revenue generating and/or cost saving activities. The charger may be located within the vehicle as part of its internal charging system or outside of the vehicle as an offboard option that is compatible with existing electric vehicles. An offboard DC fast charger, such as the embodiment disclosed below, provides additional operational value as it can charge at a faster rate than an onboard charger, which may only be 3.6 or 6.6 kW depending on the particular vehicle.

The bi-directional charger, such as the bi-directional charger disclosed in U.S. patent application Ser. No. 17/102,284, which is incorporated by reference herein in its entirety, can facilitate power flow from an AC source, such as the utility grid to an electric vehicle or from the electric vehicle to the AC connection. Such a bi-directional charger provides a choice of which of those two operations to perform (i.e., grid-to-vehicle or vehicle-to-grid) and interfaces with (or includes) software to determine when and how to perform a particular operation. Unlike a standard quick charger for electric vehicles, a bi-directional charger, such as the bi-directional charger disclosed in U.S. patent application Ser. No. 17/102,284, which is incorporated by reference herein in its entirety, would report that it is connected to the electric vehicle and is an available resource, while software would then determine what operation to perform and whether to initiate the operation. The connection to the electric vehicle may be required to have an electrical connection or power flow and a communications path for a protocol for accessing the electric vehicle (i.e., a vehicle communications standard). Several competing vehicle communications standards exist. A bi-directional charger, such as the bi-directional charger disclosed in U.S. patent application Ser. No. 17/102,284, which is incorporated by reference herein in its entirety, may use any suitable vehicle communications standard, such as CHAdeMO. Such a charger may also send messages to the electric vehicle through the communications path.

Such revenue generating and/or cost saving activities may be further optimized according to the present disclosure.

Aspects of the present disclosure are described herein with reference to flowchart illustrations and/or block diagrams of methods, apparatuses (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. Those computer program instructions may be provided to a processor of a general-purpose computer, special purpose computer, or other programmable data processing apparatus to produce a machine, such that the instructions, which are executed via the processor of the computer or other programmable instruction execution apparatus, create a mechanism for implementing the functions/acts specified in the flowchart and/or block diagram block or blocks.

Those computer program instructions may also be stored in a computer-readable medium that, when executed, can direct a computer, other programmable data processing apparatus, or other devices to function in a particular manner, such that the instructions, when stored in the computer-readable medium, produce an article of manufacture that includes instructions which, when executed, cause a computer to implement the function/act specified in the flowchart and/or block diagram block or blocks. The computer program instructions also may be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

For a more complete understanding of the nature and advantages of embodiments of the present disclosure, reference should be made to the ensuing detailed description and accompanying drawings. Other aspects, objects and advantages of the disclosed embodiments will be apparent from the drawings and detailed description that follows. However, the scope of the disclosed embodiments will be fully apparent from the recitations of the claims.

Introduction of V2X Applications

The disclosed embodiments may be implemented in any "X" number of applications, such as vehicle-to-grid applications, vehicle-to-building applications, vehicle-to-home applications, vehicle-to-vehicle applications, etc. (i.e., vehicle-to-X applications, or "V2X"). The differences in each such "X" application are primarily the system with which the electric vehicle is integrated. For example, the disclosed embodiments may be used to integrate electric vehicles with the electric grid (i.e., vehicle-to-grid) or they may be used to integrate electric vehicles with a building's electric load in a behind-the-meter system (i.e., vehicle-to-building). A behind-the-meter system is a system comprised of the electrical system that is metered by a utility, such as the electrical system in a commercial building or a private home. The grid may be a larger system that includes everything between a plug and the utility. It should therefore be understood that vehicle-to-building applications, vehicle-to-home applications, vehicle-to-vehicle applications, etc. may be part of, or even referred to as, vehicle-to-grid applications.

The disclosed V2X system enables the battery or batteries in an electric vehicle or vehicles to provide energy storage services when the battery of the vehicle is not being used, such as when the vehicle is stationary and/or turned off. In the V2X system, stored energy in the electric vehicle batteries may provide valuable services to virtually anyone in need of additional electricity (e.g., grid operators, utilities, building owners, homeowners, etc.). The electricity from the electric vehicle batteries may be used, for example, to reduce electricity costs and strengthen operational resiliency by reducing the load on other sources of electricity (e.g., the grid, solar panels, stationary batteries, etc.). The V2X system may engage an electric vehicle's batteries in multiple activities or market applications of V2X to generate revenue or conserve resources in addition to bidirectional charging.

Engaging in V2X operations requires an electric vehicle that is configured for bi-directional charging (e.g., a NISSAN brand Leaf electric vehicle), a bi-directional power conversion device at the charging site (e.g., the bi-directional charger disclosed in U.S. patent application Ser. No. 17/102,284, incorporated by reference herein in its entirety), and a software system that enables interoperability between the electric vehicle, charger, power grid, and any other energy assets (e.g., solar, wind, stationary battery, etc.) and is capable of managing and optimizing vehicle-to-grid technology. Any vehicle powered by a battery is capable of V2X operations if it is configured for bi-directional power conversion. A key component of the charger is a bi-directional power conversion structure, or power stage, comprising interconnect devices and power conversion equipment that is configured to charge the vehicle batteries from the grid or discharge the vehicle batteries' stored energy back into the grid or building. This type of bidirectional charging may be provided by locating the charger onboard the electric vehicle itself or locating the charger outside the vehicle as an offboard option that is compatible with existing electric vehicles. The software has several functions, including receiving information from vehicles (e.g., state of charge, battery voltage, maximum charge and discharge current levels, vehicle status, etc.), sending vehicles charge/discharge instructions (e.g., power level, start/stop commands, charger status, etc.), and receiving inputs of various data elements (e.g., current building load kW demand, building load kW demand target not to exceed, weather data (e.g., temperature and humidity), grid market factors, etc.).

The optimization methods of the present disclosure may be configured to provide and/or facilitate any one or more energy services. Examples of energy services include, but are not limited to, frequency regulation, demand charge management, spin/non-spin reserves, voltage support, black start, capacity, energy arbitrage, wholesale energy market arbitrage, resource adequacy, distribution deferral, transmission congestion relief, transmission deferral, time-of-use bill management, demand charge reduction, backup power/resilience (particularly for disaster recovery).

General Topology of Bi-Directional Charger

In general, an electric vehicle charger may include power electronics, one or more controllers, and one or more cable/connector plugs. The power electronics are located inside any suitable enclosure, which protects the electronic components from the elements. The power electronics are responsible for supplying power to the electric vehicle and include passive components (inductors, resistors, capacitors, transformers), passively and actively switched semiconductor devices (switches, rectifiers, protective devices), and other electronics. The one or more controllers are configured to monitor and control charging functions and network functions. And the one or more cable/connector plugs are configured to connect a charger to an electric vehicle (via its charging port or other connection point) to be charged, sometimes referred to as a cable gun. The cable/connector plug may include a locking mechanism to prevent the charger from being disconnected from the electric vehicle (as described in U.S. Provisional Patent Application No. 62/814,712, incorporated by reference herein in their entirety).

Charging stations may comprise multiple chargers and may be located in any suitable place, including, but not limited to, public locations, such as a grocery store, where an individual may charge their electric vehicle, or outside a municipal building to service a fleet of electric vehicles owned by a government entity for municipal use.

Figure 1B:
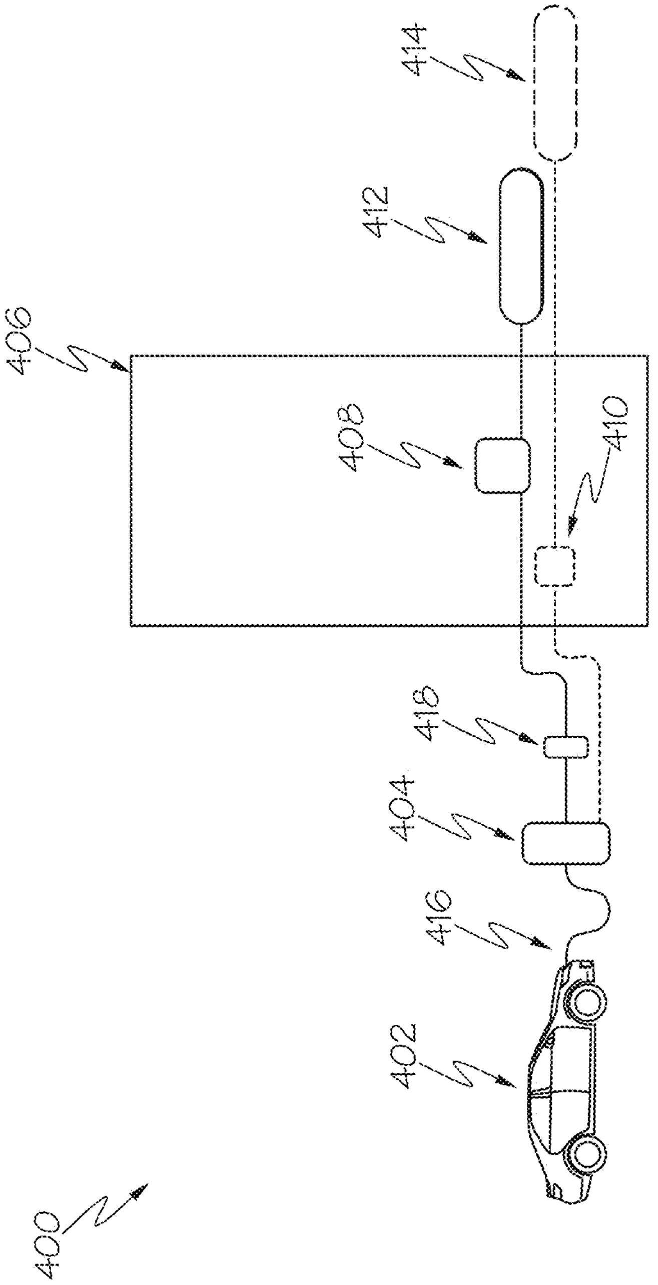

An embodiment of a charger that can be used with the present disclosure is disclosed in U.S. patent application Ser. No. 17/102,284, incorporated by reference herein in its entirety. Such a bi-directional charger includes a controller, DC/DC converter, isolation stage, and AC/DC converter. The controller may provide a user interface via a local display and buttons, or via communication network, including a local network, gateway, or cloud-based system of application. The AC/DC converter may be connected to an electrical grid, utility grid, or other suitable AC electrical connection point (ECP). The DC/DC converter may be connected to an electric vehicle or other suitable DC electrical connection point (ECP). The controller may be in communication with a network, including a local network, gateway, or cloud-based system of application. This basic topology is depicted in FIGS. 1A & 1B. For example, an electric vehicle 402 may be connected to a bi-directional charger 404 through a quick-change port 416 or other suitable connection mechanism. A disconnect 418 may exist between the charger 404 and building 406. The building 406 has a building electrical panel 408 or other suitable connection mechanism to connect to the grid 412 and a local ethernet port 410 or other suitable connection mechanism to connect to the Internet 414. The controller may also perform commands and tasks as required by specifications for the electric vehicle industry, electric utility industries, or other suitable regulatory or operational control entities. The disclosed bi-directional charger provides high power and efficiency in a smaller package, which allows for wall-mounted options, in turn requiring less labor and equipment to install the chargers.

The local user interface may be any suitable graphical user interface with a display screen and means for user input. For example, the display screen may include a 4×20 character display and 3 buttons for the user to interact with the charger. In addition, the display screen may be angled in such a manner as to keep the screen out of direct sunlight but also be visible from the average person's height. For example, if the display screen is mounted to a wall, the screen may lean forward 5 degrees relative to the wall.

The bi-directional charger disclosed in U.S. patent application Ser. No. 17/102,284, incorporated by reference herein in its entirety, is configured to be used with an electric vehicle implemented in any "X" number of applications, such as vehicle-to-grid applications, vehicle-to-building applications, vehicle-to-home applications, vehicle-to-vehicle applications, etc. (i.e., vehicle-to-X applications, or "V2X"), as described above.

The bi-directional charger disclosed in U.S. patent application Ser. No. 17/102,284, incorporated by reference herein in its entirety, is configured to perform charging and discharging operations between an electric vehicle and an AC electrical connection point, such as the utility grid, a microgrid, an AC branch circuit, or other suitable electric grid. However, the bi-directional charger could also be used to provide power conversion and flow between any suitable DC electrical connection point and AC electrical connection point. This could be done by modifying the input and output mechanisms, such as the cable/connector plug, as required to suit the application.

The rate of charge and discharge of the disclosed bi-directional charger may be controlled or restricted based on communication in terms of maximum current levels (either charging or discharging current polarity) or as maximum power levels (in Watts). These levels may be determined by the technical capability of the bi-directional charger. In another embodiment, the rate of charge and discharge of the disclosed bi-directional charger may also be a function of both the charger itself and the electric vehicle. Electric vehicles as part of their communication protocol may communicate the maximum limits the vehicle can support to the charger. The maximum limits for the electric vehicle may be defined by the vehicle manufacturer and typically constrain vehicle power capability in terms of battery warranty. The charger may then default to a level that is satisfactory to both the charger and the electric vehicle managing the maximum power that is supported on a technology level by the charger and limits in software to maintain the battery warranty terms of the electric vehicle. For example, the bi-directional charger itself could support a maximum of 15 kW, while the electric vehicle may only support a maximum of 10 kW. Thus, the bi-directional charger would default to 10 kW or less to maintain the battery warranty.

The bi-directional charger disclosed in U.S. patent application Ser. No. 17/102,284, incorporated by reference herein in its entirety, may support 220-500 volts (V) DC on the DC side, which may be the interface to the electric vehicle. This range covers specifications for the Nissan LEAF and other electric vehicles on the market. However, any suitable range of voltage levels and other operational specifications may be used depending on the electric vehicle communication standard being used (e.g., CHAdeMO or CCS specifications). On the AC side of the disclosed charger, the grid connection provided may be a standard utility grid connection. This may be a three-phase, 480 V connection as typically seen in industrial equipment in a factory setting. Alternately, the utility grid connection may be a single phase connection appropriate for residential or home usage when used in conjunction with an appropriate AC transformer. Further, the disclosed bi-directional charger may be used indoors and outdoors. The disclosed charger may accommodate a range of environmental conditions and may operate in an ambient temperature range of −20° C. to 40° C.

The bi-directional charger disclosed in U.S. patent application Ser. No. 17/102,284, incorporated by reference herein in its entirety, may use a distributed software environment where command and control of the charger may be performed through any suitable interface, as described in more detail below. This interface may also allow software that is stored in the cloud or on another suitable external server to connect to the charger. The charger may use the interface to obtain information and issue commands. For example, in U.S. patent application Ser. No. 16/802,808, issued as U.S. Pat. No. 11,135,936, which is incorporated by reference herein in its entirety, the disclosed charger may communicate with such software to engage in revenue generating activities. The bi-directional charger disclosed in U.S. patent application Ser. No. 17/102,284, incorporated by reference herein in its entirety, may also have the ability to perform remote firmware updates as needed on the device. This may allow for correction of software problems or the ability to add new features and controls to the charger, such as the ability to perform additional revenue generating activities.

Figure 1C:
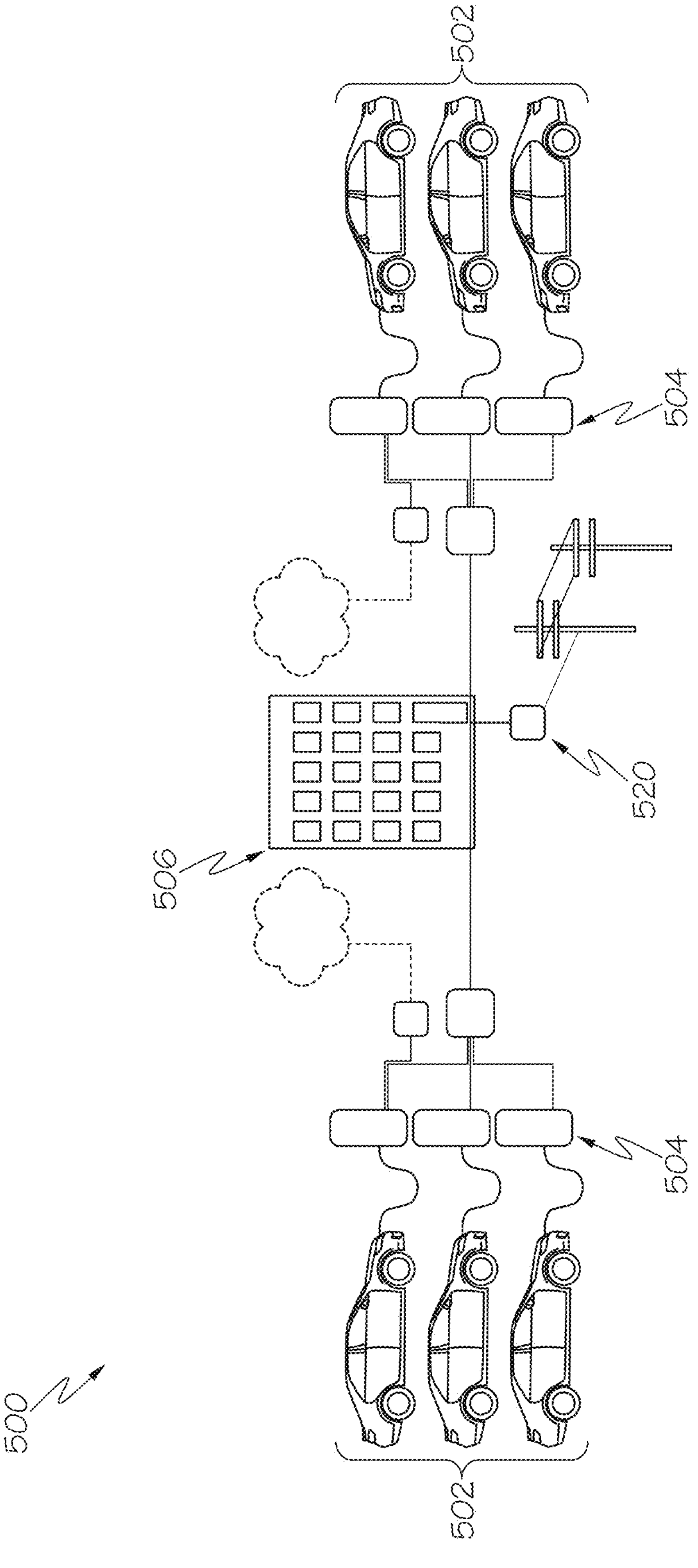

While the disclosure regarding the bi-directional charger in U.S. patent application Ser. No. 17/102,284, incorporated by reference herein in its entirety, primarily relates to the operation of one charger, multiple chargers may be placed and used in parallel. For example, a V2X system 500 for engaging revenue generating and/or cost saving activities is depicted in FIG. 1C that includes a fleet of electric vehicles 502 connected to bi-directional chargers 504 connected to building 506 behind the building's utility meter 520. Each vehicle connects to the building in a similar manner using the components depicted in FIG. 1B. Although the exemplary embodiment of FIG. 1C is depicted with six (6) bi-directional chargers, any suitable number of bi-directional chargers may be used depending on the needs of the particular building and/or availability of and number of electric vehicles able to be scheduled. For example, the software could instruct any suitable number of chargers 504, such as two, simultaneously to be charging or discharging in order to achieve the desired effect for the facility's overall load situation. One of the chargers 504 may send a message to a particular electric vehicle that connects to it where the message may be instructing the user to plug the particular electric vehicle into a different charger (e.g., one of the other five (5) chargers 504), so the present charger may remain open for a vehicle that has a battery that is capable of being discharged into the grid (as described in U.S. patent application Ser. No. 16/802,808, issued as U.S. Pat. No. 11,135,936, incorporated by reference herein in its entirety).

General Topology of Bi-Directional Charger Network

Figure 2:
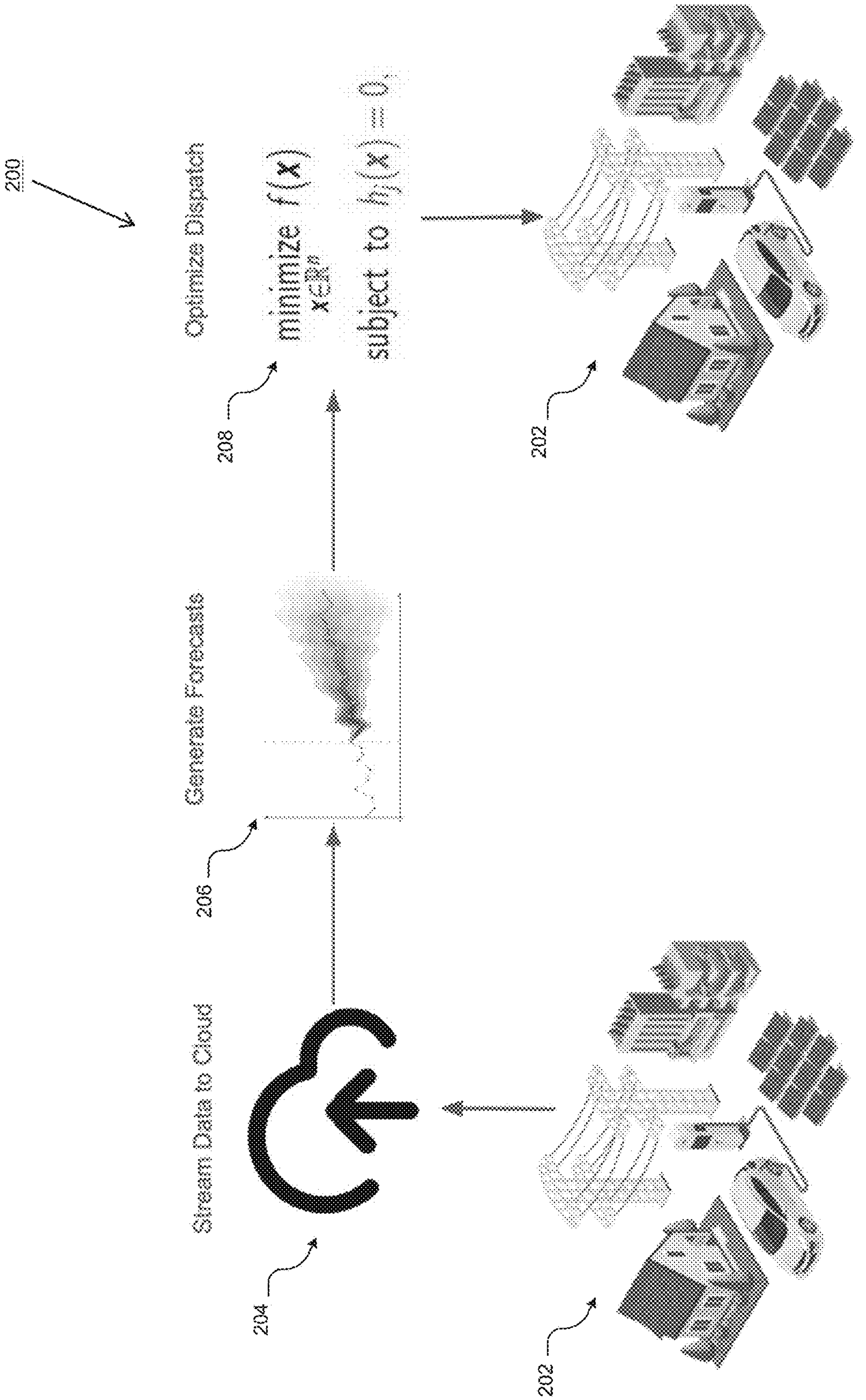
FIG. 2 is a diagram of the basic topology of a system for bi-directional charging and discharging operations according to the present disclosure.

In general, an electric vehicle charging network 200 may include a site 202 where an electric vehicle battery of an electric vehicle may be charged at a bi-directional charger as shown in FIG. 2 (and also as described in U.S. patent application Ser. No. 16/802,808, issued as U.S. Pat. No. 11,135,936, incorporated by reference herein in its entirety). While this disclosure describes a site 202 that comprises one or more components in a particular arrangement, this disclosure contemplates a site 202 that comprises any number of suitable components in any suitable arrangement. As an example, and not by way of limitation, the site 202 may have five separate bi-directional chargers and four electric vehicles coupled to four of the five separate bi-directional chargers. The site 202 may include one or more components to access one or more of a grid, nearby buildings, etc. The site 202 may couple the bi-directional charger to one or more of the grid or nearby buildings.

One or more components of the site 202 (e.g., electric vehicle, bi-directional charger, buildings, grid, etc.) may collect and stream data to a cloud 204. As an example, and not by way of limitation, the electric vehicle may collect data corresponding to a state of charge of the electric vehicle battery and send data to the cloud 204. As another example and not by way of limitation, the bi-directional charger may collect data corresponding to a state of charge of the electric vehicle battery and send data to the cloud 204. The one or more components of the site 202 may collect data to forecast a future energy consumption and future energy production of the site 202. As an example, and not by way of limitation, the one or more components of the site 202 may collect data corresponding to historical building usage of buildings located at the site 202, historical data corresponding to energy production, weather data, energy supplied from other sources, other data that affects the future energy consumption and future energy production of the site. The cloud 204 may represent one or more computing systems of a server associated with the bi-directional charger. The cloud 204 may receive the data associated with the site 202. The cloud 204 may store the received data in one or more databases. The cloud 204 may access the stored received data of one or more databases to perform an analysis on the data.

The cloud 204 may analyze data stored in one or more databases to generate a forecast 206 of future energy consumption and future energy production at a site. As an example, and not by way of limitation, the data collected at the site 202 may comprise information of corresponding to one or more entities consuming energy at the site 202. As another example and not by way of limitation, the data collected at the site 202 may comprise information of one or more entities producing energy at the site 202, such as one or more solar panels, windmills, and the like. For instance, data of historical energy usage for a building and data of historical energy production may be collected by one or more computing systems (e.g., a computer of the building, an energy monitoring system of the building, etc.) and stored to be analyzed to generate a forecast 206 of future energy consumption and future energy production (e.g., from solar panels). The cloud 204 may use a machine-learning model to generate the forecast 206 of the future energy consumption and future energy production at the site 202. The machine-learning model may be trained on historical energy consumption and historical energy production at one or more different sites 202. As an example, and not by way of limitation, the machine-learning model may take inputs corresponding to one or more of weather data (e.g., historical weather data and weather forecasts), historical energy consumption, historical energy production, energy sources, and the like to generate a forecast 206 of the future energy consumption and future energy production at a site 202.

The cloud 204 may use one or more of an optimization algorithm or a machine-learning model to generate a dispatch schedule 208 for one or more electric vehicle batteries of electric vehicles coupled to the bi-directional chargers of the site 202. As an example, and not by way of limitation, the cloud 204 may utilize the forecast 206 of future energy consumption and the optimization algorithm to determine a future time period to charge or discharge one or more electric vehicle batteries to generate dispatch schedule 208, i.e., create a charge and discharge schedule for each electric vehicle and charger. The cloud 204 may send instructions to one or more bi-directional chargers located at the site 202 to implement a dispatch schedule 208 for an electric vehicle battery coupled to the respective bi-directional charger. The dispatch schedule 208 may indicate one or more start and stop times to charge and/or discharge an amount of power over a future period of time using a dispatch profile, including a precise amount that should be charged and/or discharged for each of the one or more start and stop times. Software responsible for initiating the software running the optimization algorithm or model may be triggered by any suitable event or elapsed period of time. For example, the optimization algorithm or model may be triggered anytime an electric vehicle plugs into (or otherwise connects to) a bi-directional charger or unplugs (or otherwise disconnects).

The cloud 204 may periodically generate new forecasts 206, which are used as inputs to the optimization algorithm that solves for dispatch schedule 208 for one or more electric vehicle batteries of electric vehicles coupled to bi-directional chargers located at the site 202. Whenever the optimization algorithm is triggered, the optimization algorithm will retrieve the current forecasts from the cloud or other server. The cloud 204 may receive one or more triggers to generate a new forecast 206 and subsequent new dispatch schedule 208. The one or more triggers may include one or more of a new electric vehicle connecting to a bi-directional charger at the site 202, a change in weather, an emergency signal, changes in energy demand of the grid, and the like. As an example, and not by way of limitation, if a new electric vehicle connects to a bi-directional charger located at a site 202, the bi-directional charger or the electric vehicle may send a signal to the cloud 204 requesting a new dispatch schedule 208. The cloud 204 may regenerate a forecast 206 and subsequent dispatch schedule 208 after receiving the signal. The cloud 204 may store data corresponding to each electric vehicle connecting to the one or more bi-directional chargers at the site 202. The cloud 204 may analyze historical data, such as how long a particular electric vehicle typically stays connected at a site 202 (e.g., the site 202 the electric vehicle is currently located or another site 202 the electric vehicle has previously been located). The cloud 204 may use the historical data to generate a forecast 206 of future energy consumption (e.g., energy consumed to charge the electric vehicle battery of the electric vehicle) and future energy production and a dispatch schedule 208 to send to the bi-directional charger to implement with the electric vehicle battery coupled to the bi-directional charger.

Figure 3:
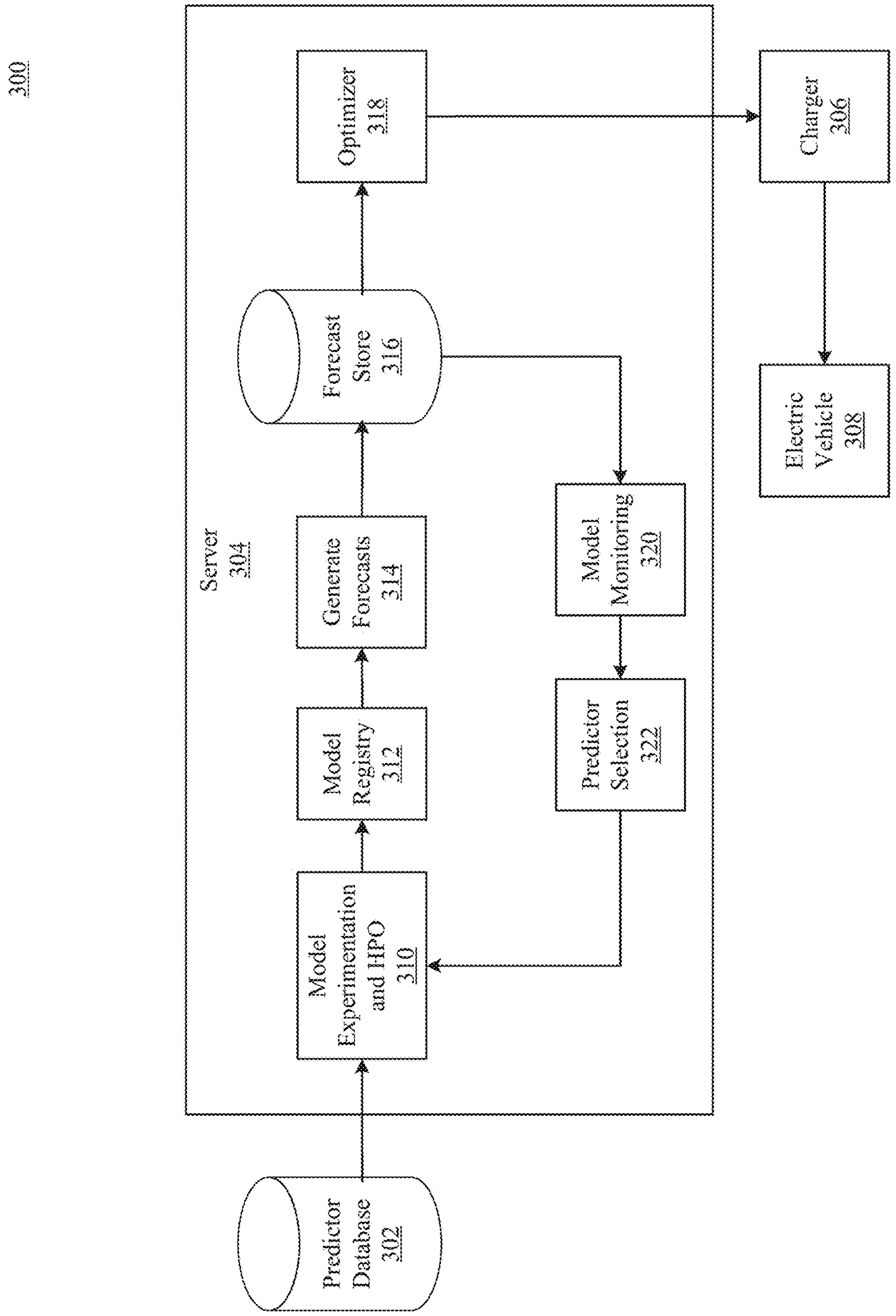
FIG. 3 is a diagram of the basic topology of a system for bi-directional charging and discharging operations according to the present disclosure.

In general, a data science pipeline 300 may include a predictor database 302, a server 304, a bi-directional charger 306, and an electric vehicle 308 as shown in FIG. 3. The data science pipeline 300 may be responsible for creating the dispatch schedules 208. Although this disclosure describes a data science pipeline 300 as containing one or more elements in a particular configuration, this disclosure contemplates a data science pipeline 300 that contains any number of elements in any suitable configuration. As an example, and not by way of limitation, the server 304 may include the predictor database 302. As another example and not by way of limitation, the server 304 may include several electric vehicles 308.

The predictor database 302 may store data to train a machine-learning model and model inference to generate a forecast of future energy consumption and future energy production. The data stored in the predictor database 302 may include latent features that are calculated from raw data. The database to store the raw data may be in another database. The server 304 may access data stored in the predictor database 302 through a model experimentation and hyperparameter optimization (HPO) block 310. The model experimentation and HPO block 310 may generate one or more models to accurately forecast future energy consumption and future energy production at a site. As an example, and not by way of limitation, the server 304 may use the model experimentation and HPO block 310 to generate a first model to accurately forecast future energy consumption and future energy production at a site located in Florida. As another example and not by way of limitation, the server 304 may use the model experimentation and HPO block 310 to generate a second model to accurately forecast future energy consumption and future energy production at a site located in Oregon. There may be a need for two different models because of the different conditions each site experiences, such as weather, different energy demands, and the like. The model experimentation and HPO block 310 may send one or more models (e.g., machine-learning model) to the model registry 312 to register the model to be used for forecasting future energy consumption and future energy production. The server 304 may use one or more models to generate forecasts 314 of future energy consumption and future energy production at one or more sites. The server 304 may store the one or more generated forecasts 314 in a forecast store 316.

The server 304 may access one or more forecasts 314 in the forecast store 316 to generate an optimized dispatch schedule using an optimizer 318 for one or more electric vehicles 308 connected to a charger 306. As an example, and not by way of limitation, the server 304 may access a forecast 314 of future energy consumption and future energy production at a particular site and generate an optimized dispatch schedule to send to a charger 306 to control a charge and/or discharge of an electric vehicle battery of the electric vehicle 308.

The server 304 may access one or more forecasts 314 of future energy consumption and future energy production to monitor one or more models using a model monitoring block 320. The model monitoring block 320 may determine when model drift is detected. When the model monitoring block 320 determines a model drift has occurred, a predictor selection block 322 may determine one or more data points (or variables) to update one or more models through the model experimentation and HPO block 310. The predictor selection block 322 may operate independent of model drift. The model drift may occur when the models used to generate forecasts 314 of future energy consumption has not accounted for all data points that may affect the forecast 314. The predictor selection block 322 may also update the predictor database 302 through one or more new inputs. When model drift is detected, the predictor selection block 322 may determine which variables should be used by the model experimentation and HPO block 310 and then the model experimentation and HPO block 310 may run to select which model is best for the new dynamics at the site.

Continuous Wavelets for Electricity Forecasts

Figure 4:
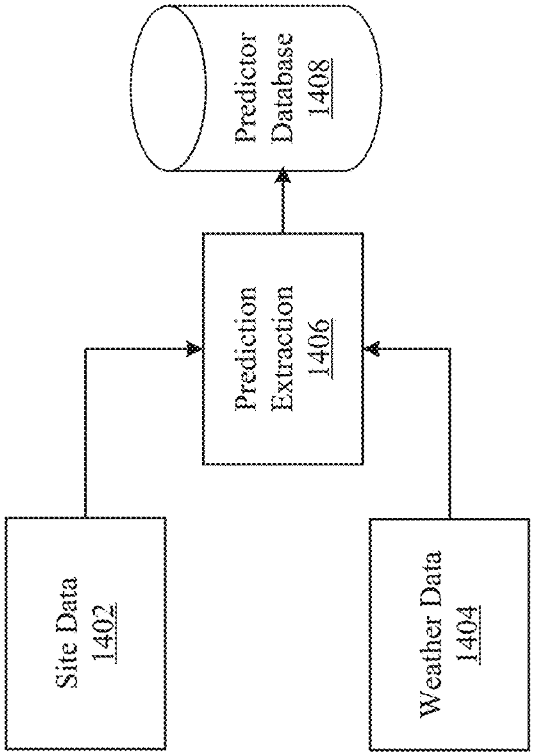
FIG. 4 is a diagram of the basic topology of a prediction stage of a bi-directional charger according to the present disclosure.

FIG. 4 is a diagram of prediction stage 1400 for a site with bi-directional charger(s). The prediction stage 1400 may include site data 1402, weather data 1404, a prediction extraction, model experimentation and HPO block 1406 and a predictor database 1408. The prediction stage 1400 may be implemented by one or more of a server or the cloud. The prediction stage 1400 may use site data 1402 and weather data 1404 to generate one or more models to forecast future energy consumption and future energy production at a site. The prediction stage may perform feature engineering to generate a training dataset for a machine-learning model. The prediction stage 1400 may apply a continuous wavelet as well as additional feature engineering to a dataset to generate a training dataset for a machine-learning model. As an example, and not by way of limitation, the prediction stage 1400 may collect site data 1402 and weather data 1404, and then run a feature engineering step that will apply calculations and transformations to those variables to generate a training dataset comprised of both the collected variables and latent features. As an example of a feature engineering step, a continuous wavelet transformation may be applied to the collected variables to generate latent features. In an example embodiment, the continuous wavelet may be a Ricker wavelet. A Ricker wavelet may be defined as $$\frac{2}{\sqrt{3a}\,\pi^{\frac{1}{4}}}\left(1-\frac{x^2}{a^2}\right)e^{\left(-\frac{x^2}{2a^2}\right)}.$$

Alpha may be the width parameter of the wavelet function. Ricker wavelets for historical energy consumption of building power consumption may be calculated by determining which width parameter and wavelet coefficient is the most predictive of the historical energy consumption. The continuous wavelet may be determined based on a number of widths set to a predetermined number that corresponds to forecasting future energy consumption. The continuous wavelet may be determined based on a predetermined number for a wavelet coefficient that corresponds to forecasting future energy consumption. The prediction extraction block 1406 may apply a continuous wavelet to data collected from the site data 1402 and weather data 1404. The prediction extraction block 1406 may determine one or more data points to use to determine future energy consumption at a site and insert the one or more data points into the predictor database 1408.

Although this disclosure emphasizes the features in the training dataset generated by applying a continuous wavelet to the collected data, this disclosure contemplates other calculations that may be done and other features that may be applied, alone or in combination, to the collected data to generate one or more further statistics to be used in the training dataset instead or in combination with the training dataset generated by applying the continuous wavelet. The training dataset may be stored in a database to be accessed later by a server to perform analysis. As an example, and not by way of limitation, the training dataset may later be accessed to train a machine-learning model.

Figure 5:
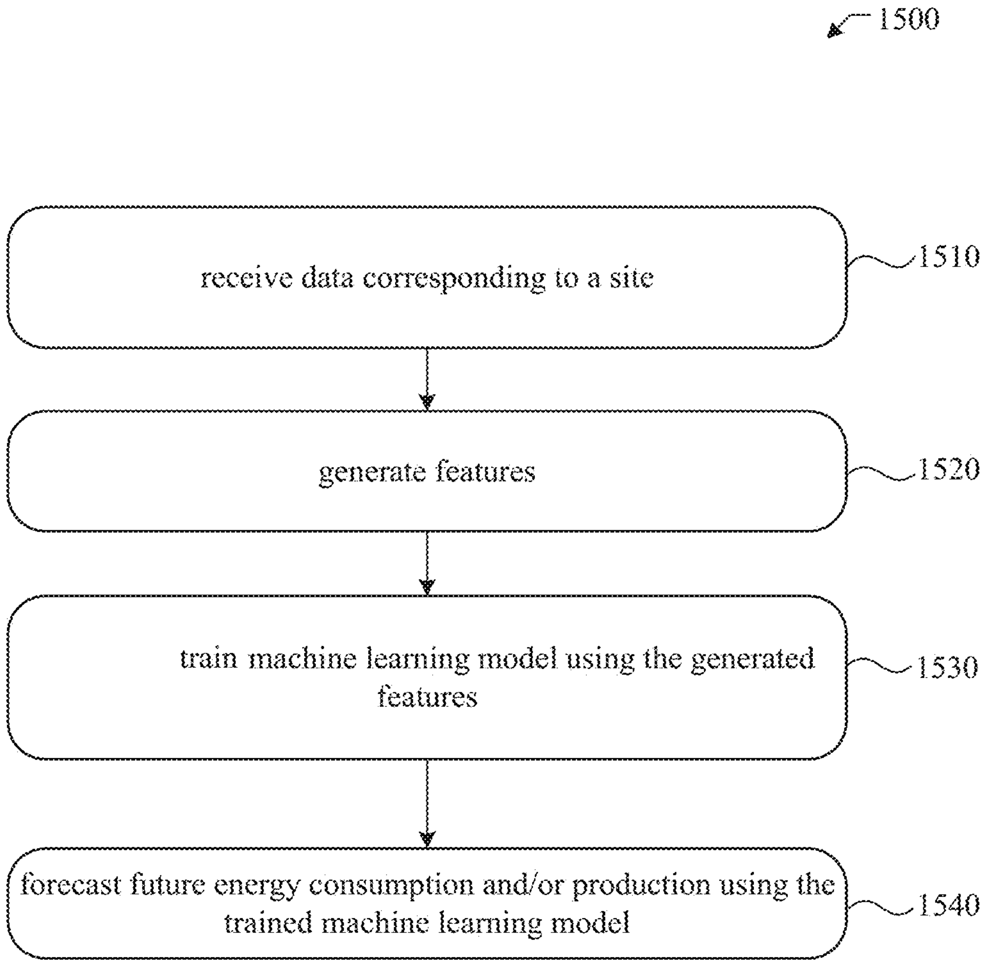
FIG. 5 is a flow chart according to an embodiment of the present disclosure.

FIG. 5 illustrates a flow chart of a process 1500. The process 1500 may use a server (304), a bi-directional charger (404, 504), and an electric vehicle (402, 502). Although this disclosure describes the process 1500 as including a number of different components in a particular arrangement, this disclosure contemplates the process 1500 as including any number of components in any suitable arrangement. As an example, and not by way of limitation, the process 1500 may include two chargers and two electric vehicles. At step 1510, server may receive data corresponding to a site where the charger(s) (such as 404 depicted in FIG. 1B or 504 in FIG. 1C) and the electric vehicle(s) (such as 402 depicted in FIG. 1B or 502 in FIG. 1C) are located. The data received by the server may include the historical weather data, historical energy consumption of one or more buildings coupled to the charger, historical on-site energy generation data (such as from solar panels), and the like. Server may receive such data from meters that meter the building consumption and any solar generation. The data may be transmitted to server using any suitable communications interface, including wirelessly or through proprietary communication link associated with the electric vehicle and/or charger. At step 1520, the server may generate features. In an exemplary embodiment according to method 1500 of the present disclosure, server may apply one or more continuous wavelets to data to generate training datasets. As an example, and not by way of limitation, the server may compile data from one or more sources to generate site data and weather data. The server may apply one or more continuous wavelets to the compiled data to generate features that will be used in training datasets for a machine-learning model to forecast future energy consumption and/or production at the site. The server may train a machine-learning model with the generated features to predict future energy consumption and future energy production (step 1530). The server may forecast the anticipated energy needs of a building coupled to the charger. At step 1540, the server may forecast future energy consumption and/or future energy production at the site corresponding to the charger and electric vehicle based on the machine-learning model using the training datasets as inputs. Server may also receive data from the electric vehicle and/or charger including one or more of a state of charge, temperature of the electric vehicle battery, and the like, but such data is not used to perform method 1500.

Figure 6:
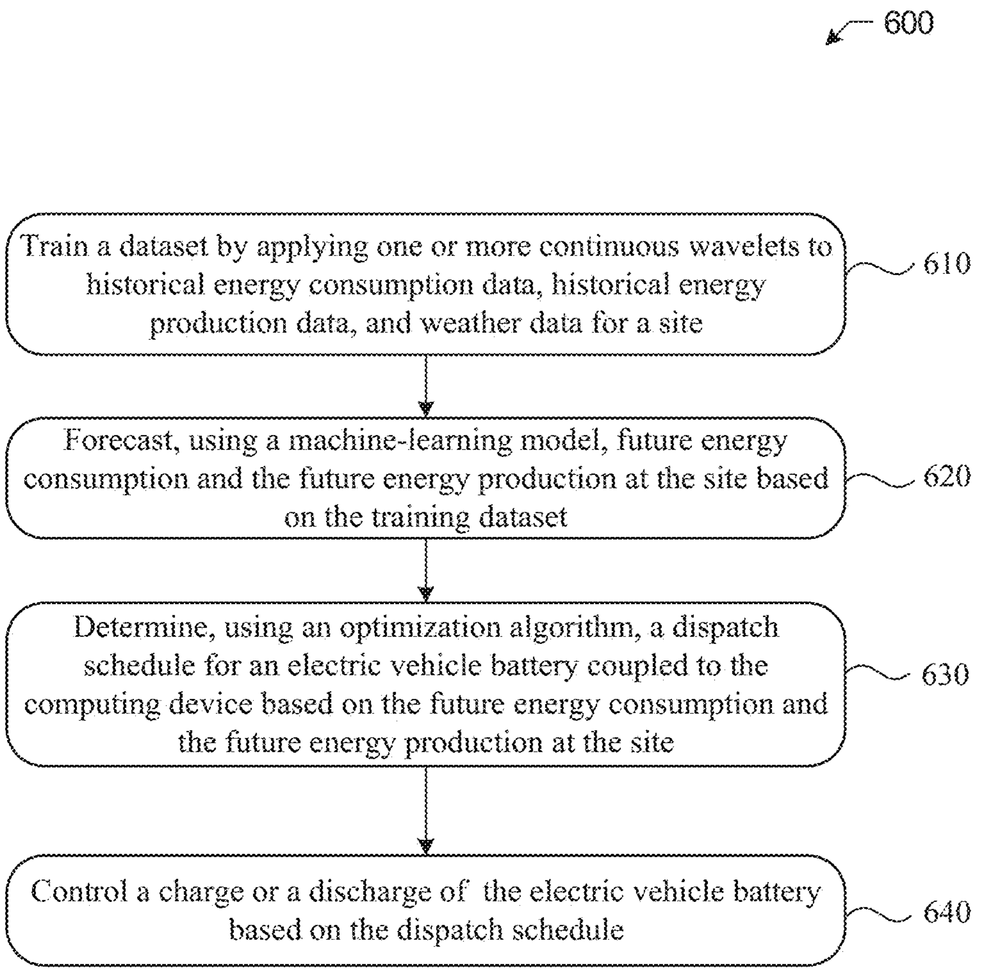
FIG. 6 is a flow chart according to an embodiment of the present disclosure.

FIG. 6 illustrates is a flow diagram of a method 600 for forecasting future energy consumption at a site, in accordance with the presently disclosed embodiments. The method 600 may be performed utilizing one or more processing devices (e.g., computing device 106) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing data, software (e.g., instructions running/executing on one or more processors), firmware (e.g., microcode), or some combination thereof.

The method 600 may begin at step 610 with the one or more processing devices (e.g., server 304) training a dataset by applying one or more continuous wavelets (in combination with other generated features) to historical energy consumption data and weather data for a site. The method 600 may then continue at step 620 with the one or more processing devices (e.g., server 304) forecasting, using a machine-learning model, future energy consumption at the site based on the training dataset. The method 600 may then continue at step 630 with the one or more processing devices (e.g., server 304) determining, using an optimization algorithm, a dispatch schedule for an electric vehicle battery. The electric vehicle battery may be coupled to the computing device. The optimization algorithm may determine the dispatch schedule for discharging the electric vehicle battery based on a predicted (or forecasted or estimated) future time period when an electric vehicle battery and/or a predicted (or forecasted or estimated) future energy consumption at the site. The dispatch schedule may include instructions to the electric vehicle battery regarding when to charge, when to discharge, for how long it should charge or discharge, and at what rate. The method 600 may then continue at step 640 with the one or more processing devices (e.g., server 304) controlling the discharge of the electric vehicle battery based on the future time period. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for forecasting future energy consumption at a site including the particular steps of the method of FIG. 6, this disclosure contemplates any suitable method for forecasting future energy consumption at a site including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Additional Capabilities of the Charger

The disclosed bi-directional charger may internally monitor temperature in the enclosure housing the power electronics components. The charger may observe temperature and upon detecting a rise or increase in temperature, the charger may de-rate the power. For example, the charger may receive a command to perform a full 15 kW charge/discharge. However, if the charger detects that the temperature is rising to excessive levels, the charger may curtail the power level back to a suitable level, such as 12.5 kW. If the temperature does not remain in a reasonable range after the power is curtailed, the charger may perform a thermal shut down. This ability to derate power before initiating a shutdown allows the disclosed charger to obtain more performance from the system before it might have to shut down, which in turn allows for supporting a higher range of operating temperatures.

The disclosed bi-directional charger may not immediately establish a charging connection when an electric vehicle is connected to the charger. When an electric vehicle is connected to the disclosed charger, the charger may require an identification code associated with the vehicle to be entered. This identification code may be manually entered into a user interface (such as described above) at the charger by a user of the electric vehicle after their electric vehicle is plugged into/connected to the charger.

The software also may provide the ability to identify the particular electric vehicle that the charger is connected to and then collect statistics and data for that particular electric vehicle, which may then be separated for long term analysis and support of battery warranty. Tracking or knowledge of battery temperature and other vehicle activities, such as those described above, may be independent of the charger (e.g., performed by the electric vehicle), in the charger, or some combination thereof (e.g., measured and communicated by the vehicle and logged and tracked by the charger). Further, through the network connection described above, the charger may communicate with the electric vehicle manufacturer to receive relevant information, such as battery temperature data regarding one or more electric vehicle batteries, to be used in long term analysis and support of battery warranty for the identified vehicle.

Alternately, the electric vehicle may have a radio-frequency identification (RFID) chip that is automatically detected by the cable gun of the charger when the charger is physically plugged into/connected to the electric vehicle. The identification code associates the particular electric vehicle with the charger and is reported to software stored on the cloud or other external server that can track metrics specific to the particular electric vehicle, such as vehicle performance and characteristics, battery state of charge, and battery temperature. The software may then analyze that data to maintain battery warranty when providing commands to the charger for charge/discharge operations with the particular electric vehicle connected to the charger.

Figure 7:
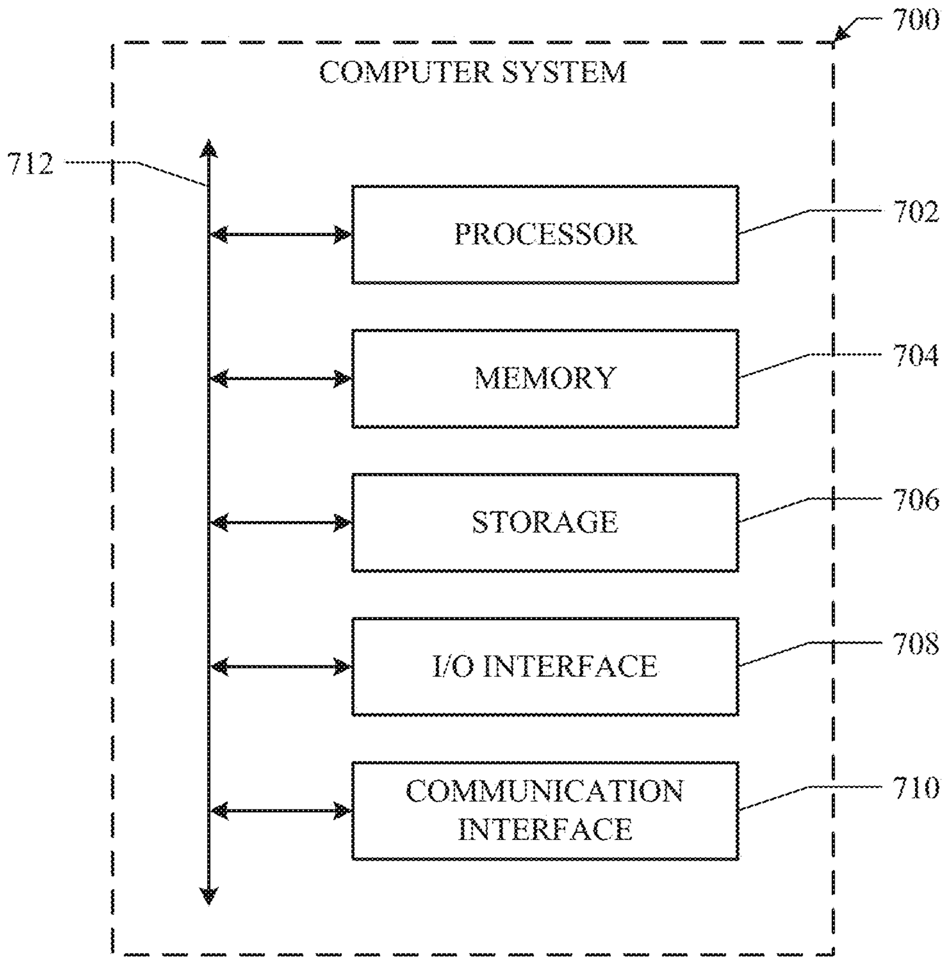
FIG. 7 is a computer system according to an embodiment of the present disclosure.

FIG. 7 illustrates an example computer system 700 that may be utilized to perform determining a predicted touch location of a touch input, in accordance with the presently disclosed embodiments. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks.

Where appropriate, one or more computer systems 700 may perform without substantial spatial or temporal limitation one or more steps of one or more methods described or illustrated herein. As an example, and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement. In particular embodiments, processor 702 includes hardware for executing instructions, such as those making up a computer program. As an example, and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example, and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702.

Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example, and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere).

One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memory devices 704, where appropriate. Although this disclosure describes and illustrates particular memory, this disclosure contemplates any suitable memory.

In particular embodiments, storage 706 includes mass storage for data or instructions. As an example, and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it.

As an example, and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example, and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

What is claimed is:

1. An electronic device for forecasting future energy consumption and future energy production at a site in communication with the electronic device, the electronic device comprising:

one or more non-transitory computer-readable storage media including instructions; and one or more processors coupled to the storage media, the one or more processors configured to execute the instructions to:

train a dataset by generating one or more features based on historical energy consumption data, historical energy production data, and weather data for a site, wherein the one or more features comprise one or more continuous wavelets;

forecast, using a machine-learning model, the future energy consumption and the future energy production at the site based on the trained dataset;

determine, using an optimization algorithm, a dispatch schedule for an electric vehicle battery coupled to the electronic device based on the forecast future energy consumption and the forecast future energy production at the site; and control a charge or a discharge of the electric vehicle battery based on the dispatch schedule, wherein the determining, using the optimization algorithm, is triggered by at least one of a new electric vehicle coupling to the electronic device, a change in weather at the site, an emergency signal, or a change in an energy demand of a grid.

2. The electronic device of claim 1, wherein the one or more continuous wavelets are determined based on a threshold number of widths set to predetermined numbers that correspond with forecasting future energy consumption and future energy production.

3. The electronic device of claim 1, wherein the one or more continuous wavelets are determined based on a predetermined number for a wavelet coefficient that corresponds with forecasting future energy consumption and future energy production.

4. The electronic device of claim 1, wherein the one or more continuous wavelets are Ricker wavelets.

5. The electronic device of claim 1, wherein controlling the charge or the discharge of the electric vehicle battery comprises one or more of starting the charge of the electric vehicle battery, stopping the charge of the electric vehicle battery, starting the discharge of the electric vehicle battery or stopping the discharge of the electric vehicle battery.

6. The electronic device of claim 1, wherein the one or more processors are further configured to execute the instructions to:

store the training dataset in a datastore.

7. The electronic device of claim 1, wherein the one or more processors are further configured to execute the instructions to:

determine, using the optimization algorithm, an amount of power to charge or discharge based on the future energy consumption at the site, wherein the dispatch schedule of the electric vehicle battery is further based on the amount of power to charge or discharge.

8. A method for forecasting future energy consumption and future energy production at a site comprising:

training a dataset by applying one or more features based on historical energy consumption data, historical energy production data, and weather data for a site, wherein the one or more features comprises one or more continuous wavelets;

forecasting, using a machine-learning model, the future energy consumption and the future energy production at the site based on the trained dataset;

determining, using an optimization algorithm, a dispatch schedule for an electric vehicle battery coupled to an electronic device based on the future energy consumption and the future energy production at the site; and controlling a charge or a discharge of the electric vehicle battery based on the dispatch schedule, wherein the determining, using the optimization algorithm, is triggered by at least one of a new electric vehicle coupling to the electronic device, a change in weather at the site, an emergency signal, or a change in an energy demand of a grid.

9. The electronic device of claim 1, wherein the forecasting, using the machine learning model, is performed periodically.

10. The electronic device of claim 9, wherein the one or more processors are further configured to execute the instructions to:

retrieve, for the optimization algorithm, the current forecast future energy consumption and forecast future energy production at the site in response to the optimization algorithm being triggered.

11. The electronic device of claim 10, wherein the forecasting, using a machine-learning model, is triggered by at least one of a new electric vehicle coupling to the electronic device, a change in weather at the site, an emergency signal, or a change in an energy demand of a grid.

12. The electronic device of claim 11, wherein the one or more processors are further configured to execute the instructions to:

generate a new forecast future energy consumption and a new forecast future energy production in response to the forecasting being triggered.

13. The electronic device of claim 11, wherein the one or more processors are further configured to execute the instructions to:

determine a new dispatch schedule, using the optimization algorithm, in response to the forecasting being triggered.

14. The electronic device of claim 1, wherein the one or more processors are further configured to execute the instructions to:

detect, by a model monitoring block, model drift of the machine-learning model;

determine, by a predictor selection block, one or more data points; and update, a model experimentation and HPO block, the machine-learning model.

* * * * *